(12) United States Patent
Graber et al.

(10) Patent No.: US 8,376,388 B2
(45) Date of Patent: Feb. 19, 2013

(54) GOOSENECK TRAILER HITCH ACTUATOR

(75) Inventors: Howard Graber, Bonaparte, IA (US); Craig L. Witting, Keosauqua, IA (US)

(73) Assignee: JGW Enterprises, LLC, Farmington, IA (US)

( * ) Notice: Subject to any disclaimer, the term of this patent is extended or adjusted under 35 U.S.C. 154(b) by 168 days.

(21) Appl. No.: 12/946,321

(22) Filed: Nov. 15, 2010

(65) Prior Publication Data

US 2011/0121540 A1    May 26, 2011

Related U.S. Application Data

(60) Provisional application No. 61/263,869, filed on Nov. 24, 2009.

(51) Int. Cl.
*B60D 1/10*    (2006.01)
(52) U.S. Cl. .................................. 280/511; 280/504
(58) Field of Classification Search .................. 280/511, 280/504
See application file for complete search history.

(56) References Cited

U.S. PATENT DOCUMENTS

| | | | |
|---|---|---|---|
| 4,320,907 A * | 3/1982 | Eaton ............................ 280/511 |
| 4,484,760 A | 11/1984 | Rach |
| 5,385,363 A * | 1/1995 | Morey ........................... 280/511 |
| 5,528,954 A * | 6/1996 | Yoshigai ......................... 74/489 |
| 6,024,372 A * | 2/2000 | Colibert et al. ............. 280/417.1 |
| 6,234,509 B1 * | 5/2001 | Lara ............................ 280/425.2 |
| 6,264,229 B1 * | 7/2001 | Gill et al. .................... 280/441.2 |
| 6,520,527 B2 | 2/2003 | Laarman |
| 6,540,246 B2 * | 4/2003 | Andersen et al. .......... 280/417.1 |
| 6,588,790 B2 | 7/2003 | Hall |
| 6,629,700 B1 | 10/2003 | Baptiste |
| 7,097,193 B1 * | 8/2006 | Sievert ....................... 280/441.2 |
| 7,182,362 B2 | 2/2007 | Yeakel |
| 7,300,068 B1 | 11/2007 | Johnsen |
| 7,378,013 B2 * | 5/2008 | Sandler ......................... 280/507 |
| 7,384,056 B2 | 6/2008 | Anderson |
| 7,510,203 B2 | 3/2009 | Domine |
| 7,581,746 B2 | 9/2009 | Abate et al. |
| 7,762,529 B1 * | 7/2010 | Scott ............................. 254/120 |
| 2005/0253360 A1 | 11/2005 | Steyn |

* cited by examiner

*Primary Examiner* — Kevin Hurley
*Assistant Examiner* — Michael Stabley
(74) *Attorney, Agent, or Firm* — McKee, Voorhees & Sease, P.L.C.

(57) ABSTRACT

An improved hitch actuator for a gooseneck trailer includes a cam assembly mounted on the hitch receiver, a pivotal lever on the trailer, and a cable extending between the cam assembly and the lever. When the lever is pivoted, the cam assembly is moved via the cable so as to control the movement of the hitch latch between latched and unlatched positions and controls movement of the hitch pin between locked and unlocked positions.

15 Claims, 7 Drawing Sheets

GOOSENECK TRAILER HITCH ACTUATOR

CROSS-REFERENCE TO RELATED APPLICATIONS

This application claims priority under 35 U.S.C. §119 to provisional application Ser. No. 61/263,869 filed Nov. 24, 2009, herein incorporated by reference in its entirety.

BACKGROUND OF THE INVENTION

Various types of trailer hitches are well-known in the art. One type of hitch assembly includes a hitch ball mounted in the bed of a pickup truck and a gooseneck on the front of a trailer for coupling to the hitch ball. The gooseneck trailer includes a vertical column with a lower socket or receiver and a latch, to hitch the trailer to the ball in the truck bed. The latch is pivotally connected to the receiver so as to move between latched and unlatched positions relative to the hitch ball. The receiver and the latch each have an aperture slightly bigger than the diameter of the hitch ball, with the apertures being aligned when the latch is in an unlatched position so that the receiver and latch can be lowered onto the ball. The latch is then moved to the latched position, wherein the latch opening is offset with respect to the receiver opening, to thereby capture the reduced-diameter of the hitch ball and secure the trailer to the truck. A lock pin is inserted through the receiver and the latch to prevent movement of the latch to the unlatched position. When it is desired to uncouple the trailer and truck, the lock pin is removed and the latch moved to the unlatched position, which allows the column to be raised so as to lift the receiver and latch from the hitch ball.

This type of truck bed hitch normally requires an operator to climb into the bed of the truck to move the latch, and to engage and disengage the lock pin. However, access to the truck bed is tight due to the configuration of the trailer, gooseneck and truck tailgate. Different types of remote actuators have been designed and developed to eliminate the need to climb into the bed of the truck to lock and unlock the trailer from the hitch ball. While such remote actuators are an improvement, generally, these prior art devices still have shortcomings which make their use and/or installation less than ideal.

Therefore, a primary objective of the present invention is the provision of an improved remote trailer hitch actuator for locking and unlocking a gooseneck trailer to a hitch ball in the bed of a truck.

Still another objective of the present invention is the provision of an improved hitch assembly for a gooseneck trailer with a cam actuator for coupling and uncoupling the trailer to the hitch ball.

Yet another objective of the present invention is the provision of an improved hitch actuator for a gooseneck trailer including a cam assembly mounted on the hitch receiver and a control lever mounted on the trailer to control movement of the hitch pin between lock and unlocked positions relative to the hitch latch.

A further objective of the present invention is the provision of an improved method of hitching and unhitching a trailer with a gooseneck to a hitch ball in a truck bed.

Still another objective of the present invention is the provision of an improved hitching and unhitching method for a gooseneck trailer wherein a cam assembly is actuated in opposite directions to move the lock pin between locked and unlocked positions and to move the latch between latched and unlatched positions.

Another objective of the present invention is the provision of an improved hitch assembly for a gooseneck trailer wherein a cable extends between a control lever on the trailer and a cam assembly on the gooseneck so that movement of the lever actuates the cam assembly, thereby controlling the lock pin and latch of the hitch assembly.

Another objective of the present invention is the provision of a remote trailer hitch actuator for a gooseneck trailer having a control lever mounted on the trailer for easy access, without requiring an operator to enter the bed of the truck.

A further objective of the present invention is the provision of a remote trailer hitch actuator which is simple, effective, and safe in use.

These and other objectives will become apparent from the following description of the invention.

SUMMARY OF THE INVENTION

An improved hitch assembly is provided for hitching a gooseneck trailer to a hitch ball in the bed of a truck. The hitch assembly includes a column on the gooseneck or front end of the trailer, with a receiver to fit over the hitch ball. A latch on the column is moveable between latched and unlatched positions relative to the hitch ball. A lock pin on the column is moveable between a raised, unlocked position, to allow movement of the latch between the latched and unlatched positions, and a lowered lock position to preclude movement of the latch from the latched position to the unlatched position. The hitch assembly further includes a cam assembly mounted on the column adjacent the receiver and latch, a control lever pivotally mounted on the trailer, and a cable extending between the cam assembly and the lever. The cable is encased within a sheath, so as to move axially upon movement of the lever. Movement of the lever in a first direction actuates the cam assembly in a first direction, via the cable, so as to move the lock pin to the unlocked position and move the latch to the unlatched position. Movement of the lever in the opposite direction actuates the cam assembly in the opposite direction, via the cable, so as to move the latch to the latched position and move the lock pin to the locked position. This hitch assembly, with the control lever mounted on the trailer, eliminates the need for an operator to enter the truck bed to couple and uncouple the trailer to the hitch ball.

BRIEF DESCRIPTION OF THE PREFERRED EMBODIMENTS

DETAILED DESCRIPTION OF THE PREFERRED EMBODIMENTS

Figure 1:
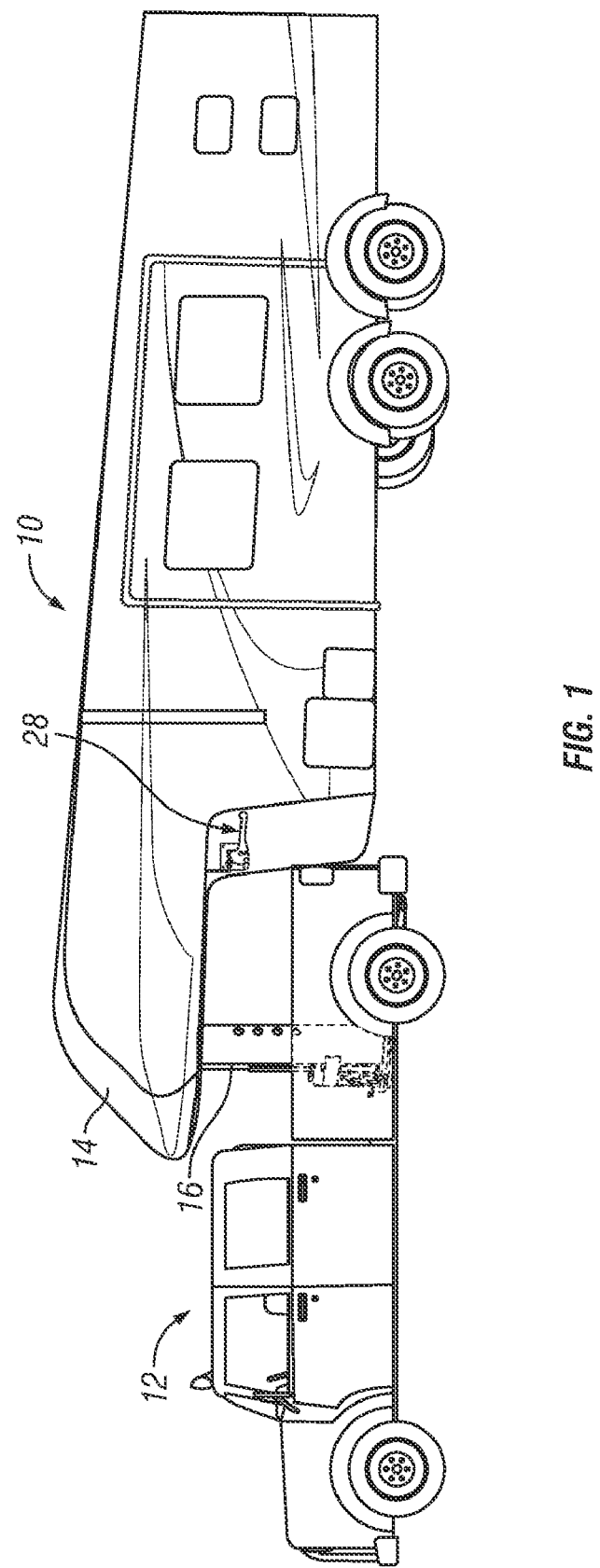
FIG. 1 is a schematic view showing a gooseneck trailer coupled to a hitch ball in the bed of a truck using the hitch assembly of the present invention.

FIG. 1 shows a gooseneck trailer 10 hitched to a truck 12. The truck has a hitch ball mounted in the bed, as well known in the art. The gooseneck 14 of the trailer 10 has a vertical tube or column 16. A socket or receiver 18 with a latch 20 is provided on the lower end of the column 16. The latch 20 is pivotally connected to the receiver 18 via a bolt or pin 22. The receiver 18 and the latch 20 each have an opening with a diameter slightly larger than the diameter of the hitch ball. The latch 20 is moveable about the axis of the pin 22 between latched and unlatched positions. When the latch 20 is in the unlatched position, the openings in the receiver 18 and latch 20 are aligned so that the column can be lowered onto the hitch ball and raised from the hitch ball. When the latch 20 is pivoted to the latched position, the opening in the latch 20 is offset or misaligned from the opening in the receiver 18 so as to secure the gooseneck 14 and trailer 10 to the hitch ball of the truck 12. A hitch or lock pin 24 is inserted through small aligned holes in the receiver 18 and latch 20 to preclude movement of the latch from the latched position to the unlatched position. When the lock pin 24 is removed from the receiver 18 and latch 20, the latch 20 is free to move between the latched and unlatched positions.

The above description of the trailer 10, column 16, receiver 18, latch 20 and lock pin 24 is conventional.

The present invention is directed towards an improved actuator for controlling movement of the latch 20 between the latched and unlatched positions and movement of the lock pin 24 between locked and unlocked positions. The actuator includes a cam assembly 26 mounted on the gooseneck column 16, a control lever 28 mounted remotely on the trailer 10, and a cable 30 extending between the cam assembly 26 and the control lever 28.

The cam assembly 26 includes a mounting bracket 32 which is welded or otherwise secured to the column 16 of the gooseneck 14. A plate 34 is slidably mounted to the bracket 32 via pins or bolts 36 extending through elongated slots 38. The hitch lock pin 24 is fixed to the plate 34 for movement with the plate 34 between raised and lowered positions. An upper clamp 40 is bolted or otherwise secured to the bracket 32, while a lower clamp 42 is bolted or otherwise secured to the plate 34. The lower end of a sheath 44 is attached to the upper clamp 40 in any convenient manner. The cable 30 extends through the sheath 44, with the lower end of the cable being clamped and secured to the lower clamp 42.

Figure 5:
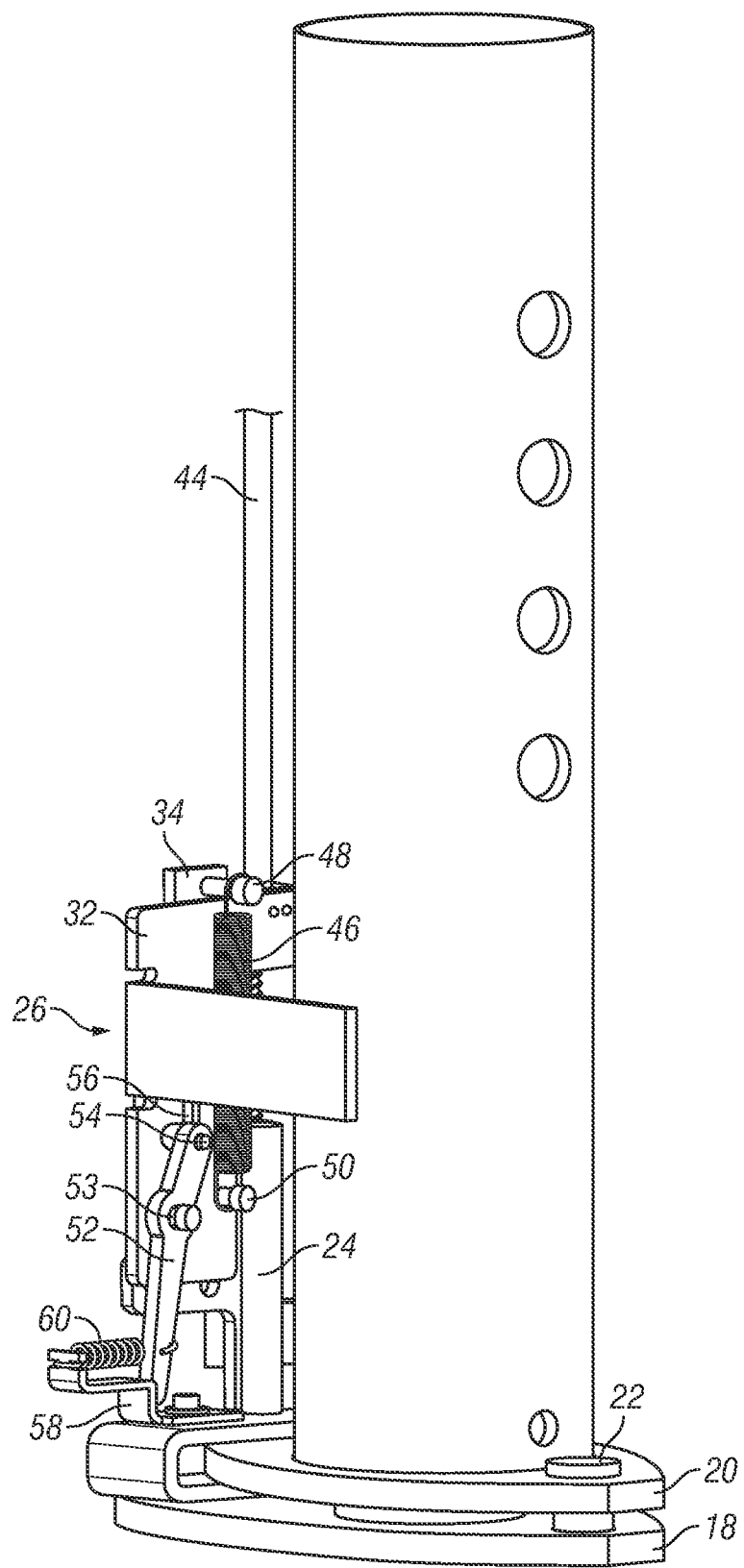
FIG. 5 is a rear perspective view of the hitch assembly in a locked position.
Figure 6:
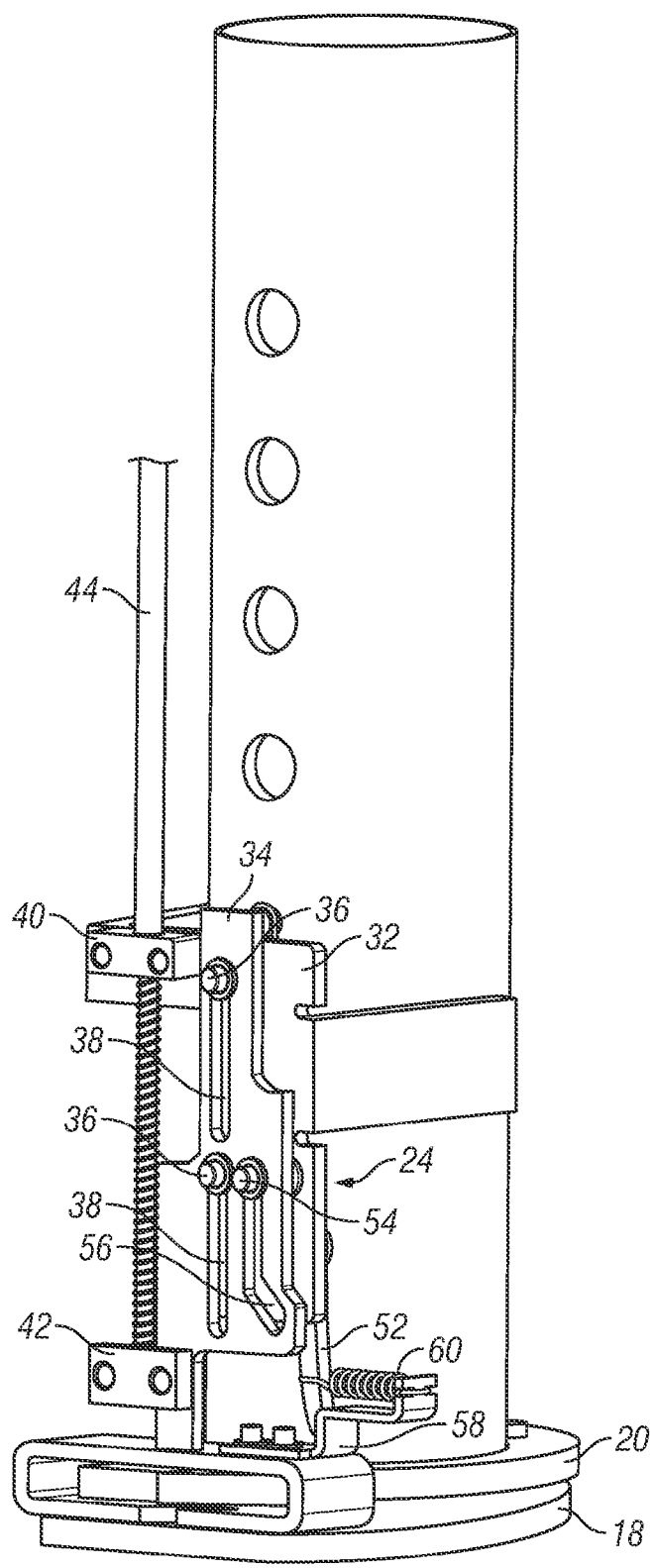
FIG. 6 is another front perspective view showing the hitch assembly in a locked position.
Figure 7:
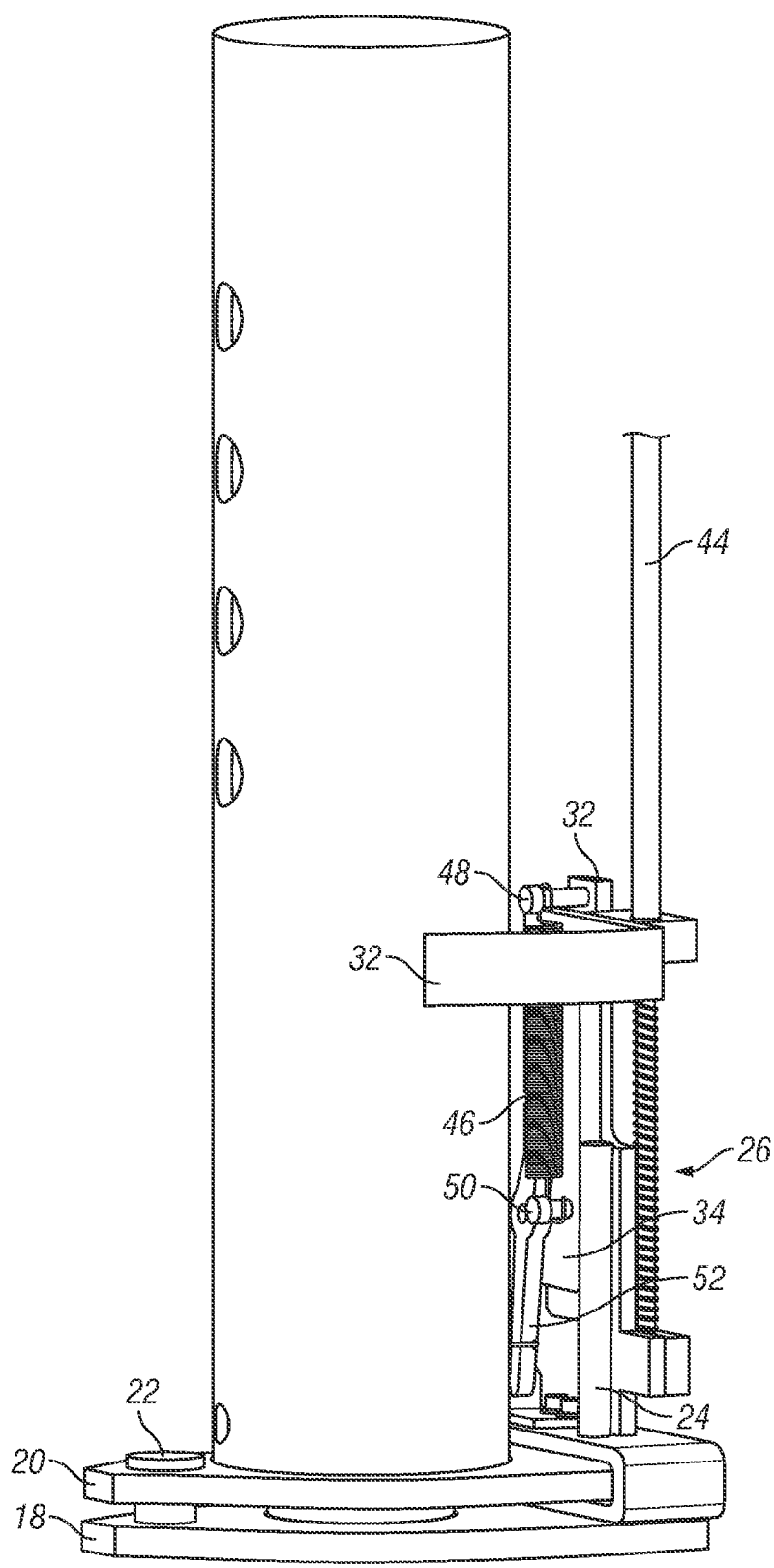
FIG. 7 is another rear perspective view showing the hitch assembly in a locked position.

The plate 34 moves upwardly and downwardly with the retraction or extension of the cable 30 through the sheath 44, respectively. The plate 34 is biased to a lower position by a spring 46 having an upper end attached to a pin 48 extending from the plate 34 and a lower pin 50 extending from the bracket 32, as best seen in FIGS. 5 and 7.

A cam arm or bar 52 is pivotally attached to the bracket 32 by a bolt or pin 53. The pin 54 extends through a slot 56 in the plate 34. The slot 56 extends vertically, parallel to the slots 38 in the plate 34, except the lower end of the slot 56 extends angularly. The flange or anvil block 58 is adjustably attached to the latch 20 so that the pivotal position of the latch 20 can be adjusted or fine tuned, as needed. Thus, the cam pin 54 functions as a cam follower in the slot 56 to pivot the cam bar 52 about the pivot axis 53. The lower end of the cam bar 52 engages a flange or anvil block 58 bolted on the latch 20. Thus, vertical movement of the cam plate 34 imparts pivotal movement of the latch 20 between the latched and unlatched positions via the cam bar 52. The bracket 32 includes a horizontal slot 59 (best seen in FIG. 5) through which the pin 54 extends and slides as the cam bar 52 pivots. The latch 20 is biased to the latched position by a spring 60 having opposite ends connected to the cam bar 52 and the flange 58.

The control lever assembly includes a mounting plate 62 attached to the trailer 10 and an arm pivotally attached to a mounting plate 62 for movement about an axis 66. The mounting plate 62 has a tab or ear 68 to which one end of the sheath 44 is attached, with the cable 30 extending through the tab 68. The end of the cable 30 is attached to the lever arm 64 in any convenient manner.

Figure 2:
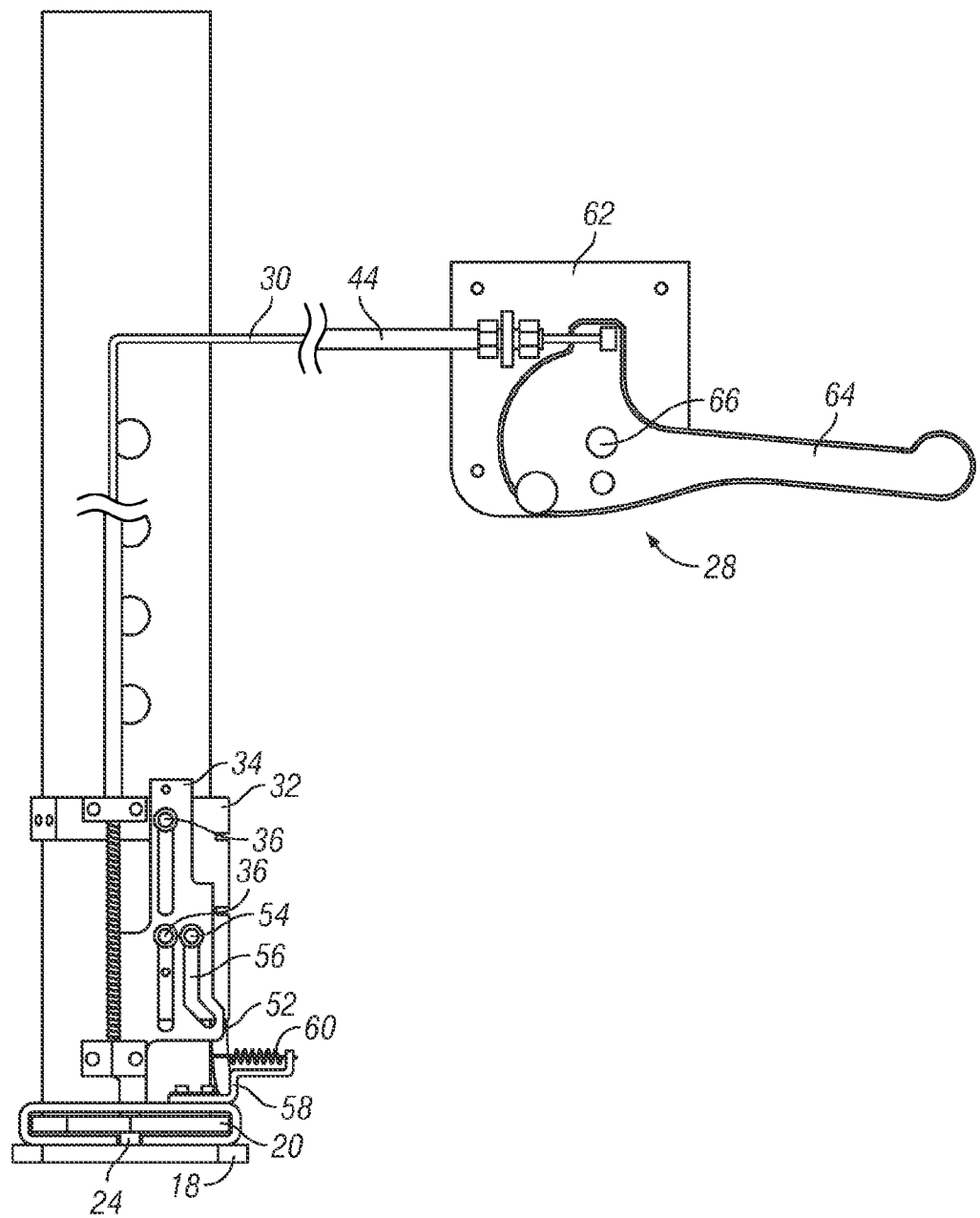
FIG. 2 is a schematic drawing of the hitch assembly of the present invention in a locked position.
Figure 3:
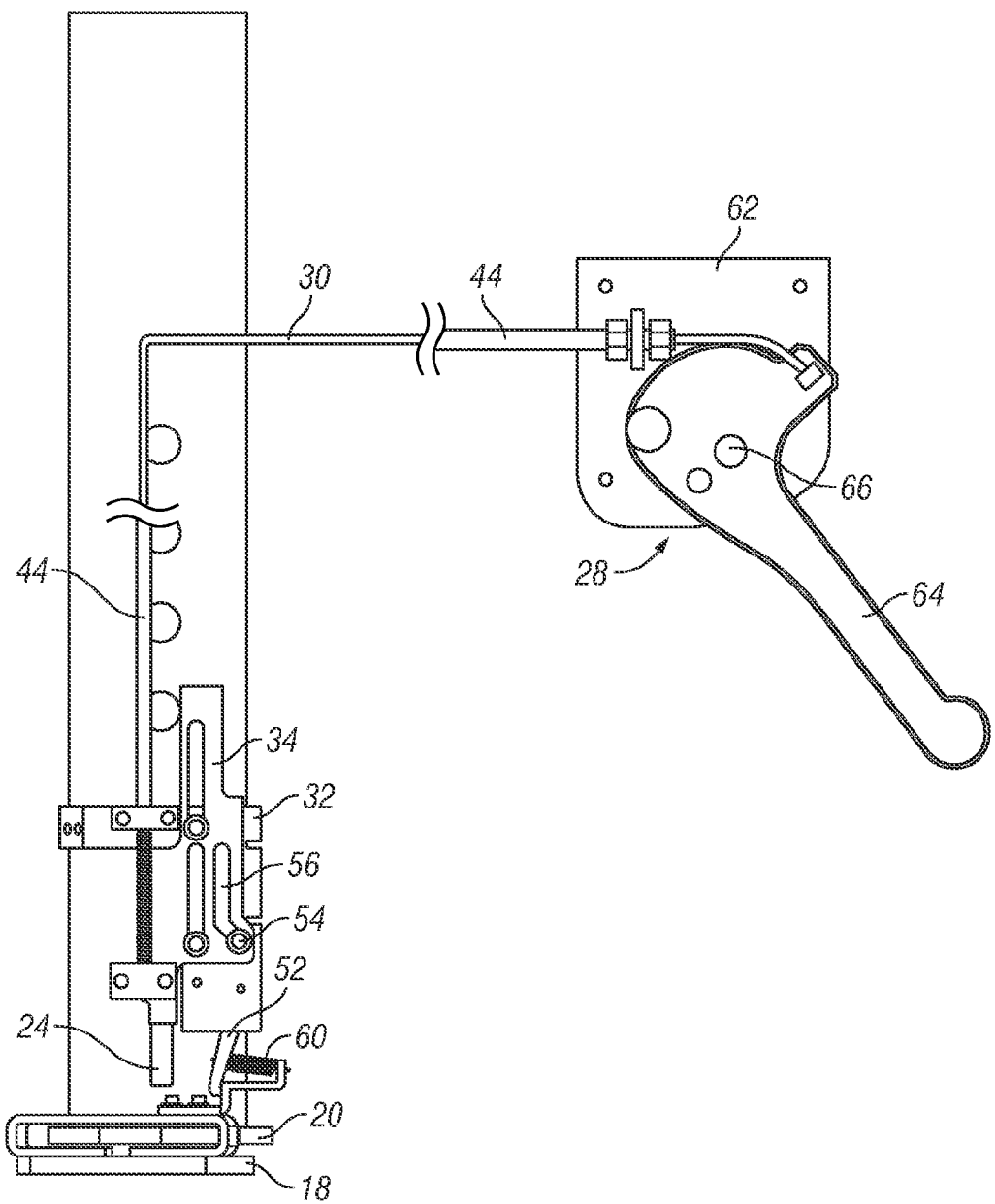
FIG. 3 is a view similar to FIG. 6 showing the hitch assembly in an unlocked position.
Figure 4:
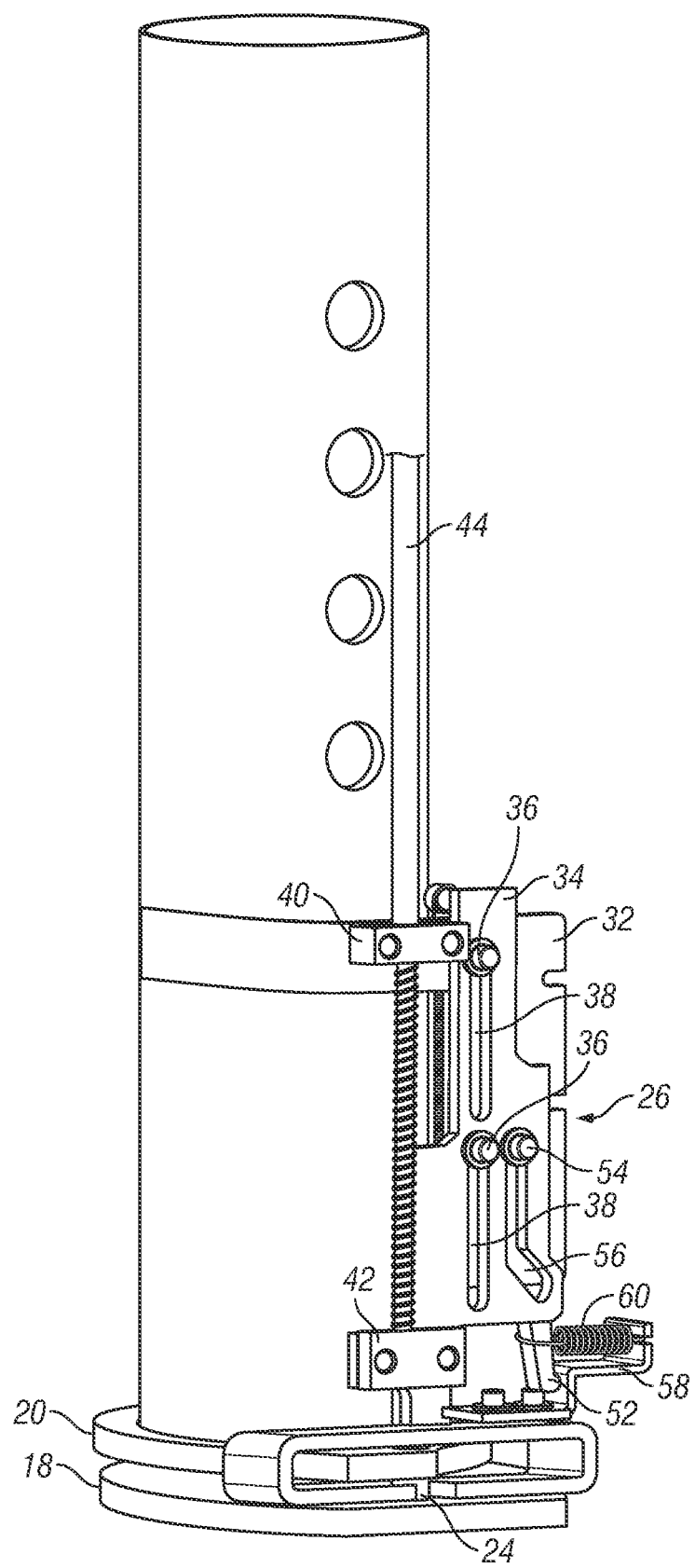
FIG. 4 is a front perspective view of the lower end of the gooseneck column of the trailer with the hitch assembly of the present invention in a locked position.

The lever arm 64 can be rotated clockwise, as seen in FIGS. 2 and 3, so as to pull or retract the cable 30 through the sheath 44 so as to raise the cam plate 34 and the attached lock pin 24. Lifting of the cam plate 34 also pivots the cam bar 52 via the angled slot 56 so as to pivot the latch 20 to the unlatched position, which aligns the receiver 18 and latch 20 so that the gooseneck column 16 can be lowered over the hitch bar. The lever arm 64 can then be rotated counterclockwise, as seen in FIGS. 2 and 3, so as to extend the opposite end of the cable 30, which lowers the cam plate 34 and the lock pin 24, and pivots the cam bar 52, to thereby allow the latch 20 to return to the latched position to secure the gooseneck column 16 on the hitch ball. The orientation of the lever arm 64 can be easily seen by a driver in the rear view mirror so as to provide a visual check that the hitch is locked while driving.

Thus, the hitch actuator formed by the cam assembly 26, control lever assembly 28 and cable 30 provides a quick and easy method and means for hitching and unhitching the trailer 10 to the truck 12 without the operator climbing or reaching into the truck bed.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved hitch assembly for hitching a gooseneck trailer to a vehicle hitch ball, comprising;
   a column on the front end of the trailer with a receiver to fit over the hitch ball;
   a latch on the column moveable between a latched position engaging the hitch ball and unlatched position disengaging the hitch ball;
   a lock pin on the column moveable between a raised unlocked position to allow movement of the latch and a lowered lock position to preclude movement of the latch;
   a cable having a first end operatively connected to the lock pin and a second end mounted to the trailer;
   a control lever pivotally mounted on the trailer and connected to the second end of the cable, the lever being moveable between a first position wherein the lock pin is in the locked position and a second position to pull the cable and thereby raise the lock pin to the unlocked position;
   a cam assembly disposed between the first end of the cable and the latch so as to move the latch to the unlatched position when the lever is in the second position and to the latched position when the lever is in the first position; and
   the cam assembly including a cam plate and a pivotal cam bar, and the cam plate being moveable between raised and lowered positions so as to pivot the cam bar between retracted and extended positions, respectively, whereby the extended position of the cam bar pivots the latch to disengage the hitch ball and the retracted position of the cam bar pivots the latch to engage the hitch ball.

2. The improved hitch assembly of claim 1 wherein the cam plate includes an angular slot and the cam bar has a cam follower in the slot so that movement of the follower along the slot imparts pivotal movement to the cam bar.

3. The improved hitch assembly of claim 1, wherein the cable is operatively connected to the cam plate.

4. The improved hitch assembly of claim 1 wherein the cam plate is spring biased to the lowered position.

5. The improved hitch assembly of claim 4 wherein the lever pulls the cam plate to the raised position via the cable when moved to the second position.

6. The improved hitch assembly of claim 1 wherein the latch is normally biased to engage the hitch ball.

7. The improved hitch assembly of claim 1 wherein the cam plate includes an angular slot and the cam bar has a cam follower in the slot so that movement of the follower along the slot imparts pivotal movement to the cam bar.

8. The improved hitch assembly of claim 1 further comprising a block on the latch, and the cam bar pushing the block laterally when moved to the extended position.

9. The improved hitch assembly of claim 8 wherein the cam bar is spring biased into engagement with the block.

10. An improved hitch actuator for a gooseneck trailer having a hitch ball receiver, a latch for locking and unlocking the receiver to the ball, and a pin for locking and unlocking the latch, the actuator comprising:
    a cam assembly mounted on the hitch receiver;
    a pivotal lever on the trailer;
    a cable extending between the cam assembly and the lever, whereby pivotal movement of the lever moves the cam assembly via the cable so as to control movement of the pin between locking and unlocking positions relative to the latch; and
    the cam assembly includes a cam plate connected to the cable and being vertically moveable and a cam bar pivotally moveable in response to vertical movement of the cam plate.

11. The improved hitch actuator of claim 10 wherein the lever and cable actuate the cam assembly, pin and latch.

12. The improved hitch actuator of claim 10 wherein the cam plate includes an angular slot and the cam bar has a cam follower in the slot so that movement of the follower along the slot imparts pivotal movement to the cam bar.

13. The improved hitch actuator of claim 10 further comprising a block mounted on the latch, and the cam bar engaging the block whereby pivotal movement of the cam bar pivots the latch between locked and unlocked positions.

14. The improved hitch actuator of claim 10 wherein the lever controls movement of the pin between locking and unlocking positions.

15. The improved hitch actuator of claim 14 wherein the lever controls movement of the latch between locked and unlocked positions.

* * * * *